United States Patent [19]

Kokura et al.

[11] Patent Number: 5,700,884
[45] Date of Patent: Dec. 23, 1997

[54] URETHANE MODIFIED EPOXY RESIN FROM EPOXY PHOSPHATE AND ISOCYANATE PREPOLYMER

[75] Inventors: Makoto Kokura; Koji Akimoto; Kazuhiro Urihara, all of Tokyo, Japan

[73] Assignee: Asahi Denka Kogyo Kabushiki Kaisha, Tokyo, Japan

[21] Appl. No.: 530,887

[22] Filed: Sep. 20, 1995

[30] Foreign Application Priority Data

Sep. 20, 1994 [JP] Japan .................................. 6-250215
Jul. 21, 1995 [JP] Japan .................................. 7-206791

[51] Int. Cl.⁶ .................................................. C08G 59/14
[52] U.S. Cl. .................................. 525/528; 525/454
[58] Field of Search .................................. 525/454, 528

[56] References Cited

U.S. PATENT DOCUMENTS

| | | | |
|---|---|---|---|
| 4,632,970 | 12/1986 | Hiza et al. | 525/460 |
| 4,692,382 | 9/1987 | Schmitt et al. | 525/523 |
| 4,835,018 | 5/1989 | Higginbotham et al. | 523/458 |
| 5,086,094 | 2/1992 | Massingill, Jr. | 525/523 |
| 5,248,559 | 9/1993 | Okui et al. | 428/414 |

FOREIGN PATENT DOCUMENTS

| | | |
|---|---|---|
| 0032054 | 7/1981 | European Pat. Off. |
| 0367667 | 5/1990 | European Pat. Off. |
| 89/10799 | 11/1989 | WIPO |

OTHER PUBLICATIONS

Derwent accession No. 89-305011/42, Asahi Denka Kogyo, Sep. 1989.
Derwent accession No. 94-322236/40, Toto Kasei KK, Sep. 1994.
Database WPI, Derwent Publications Ltd., JP-A-58-063 758 (Abstract), Oct. 1981.

*Primary Examiner*—Robert E. Sellers
*Attorney, Agent, or Firm*—Birch, Stewart, Kolasch & Birch, LLP

[57] ABSTRACT

There is provided an urethane modified epoxy resin either obtained by reaction of 100 weight portions of a preliminary condensate [A] produced by reaction of an epoxy resin and an acid of a phosphorus compound or its salt or ester and 5 to 60 weight portions of an isocyanate group-terminated urethane prepolymer [B] produced by reaction of a hydroxy compound and an organic polyisocyanate compound, or obtained by preparing an urethane modified epoxy resin [D] from 100 weight portions of an epoxy resin and 5 to 60 weight portions of the same isocyanate group-terminated urethane prepolymer [B] as the above and causing the resin [D] to react with an acid of the same phosphorus compound as the above or its salt or ester. Such an urethane modified epoxy resin can advantageously be used with an active organic hardening agent to produce an adhesive resin composition, which is highly effective for bonding iron and non-ferrous metals particularly in terms of shearing strength and peeling strength.

1 Claim, No Drawings

URETHANE MODIFIED EPOXY RESIN FROM EPOXY PHOSPHATE AND ISOCYANATE PREPOLYMER

BACKGROUND OF THE INVENTION

1. Field of the Invention

This invention relates to an urethane modified epoxy resin and a highly water-proof, chemical-proof and adhesive resin composition to be suitably used as an adhesive agent and, more particularly, it relates to a resin composition that can be suitably used as an adhesive agent for iron and non-ferrous metals such as aluminum, zinc, copper and other transition metals and provides, when set, an excellent bonding strength in terms of shearing strength and peeling strength and the like.

2. Description of Relating Art

Epoxy resin type adhesive agents are known to be highly effective for bonding metals, glass, concrete, stones and other objects. On the other hand, as they find a broader scope of application in recent years, more and more rigorous requirements are posed on them in terms of peeling strength, shearing strength, thermoresistant adhesive property, water resistant adhesive property, creep characteristics, durability and the like.

While epoxy resin generally shows a relatively high shearing strength, it does not provide a satisfactory level of peeling strength and flexibility required for structures. In order for epoxy resin to operate more satisfactorily, therefore, thermoplastic resin is normally added to it so that they are chemically combined to give rise to a reaction product or simply blended to produce an alloy.

For example, Japanese Patent Application Opened No. 61-228015 discloses an urethane modified epoxy resin obtained by chemically reacting of an urethane-prepolymer produced from a polyhydroxyl compound and a polyisocyanate compound with an epoxy resin.

Japanese Patent Application Opened No. 62-53527 teaches another urethane modified epoxy resin obtained by chemically reacting of an urethane-prepolymer produced from high and low molecular weight polyhydroxyl compounds and a polyisocyanate compound with a compound containing epoxy and hydroxyl groups.

Japanese Patent Application Opened No. 58-63758 discloses a condensation product of epoxy resin and phosphoric acid or a phosphate.

While the above cited urethane modified epoxy resins may show an appropriate level of flexibility and be highly effective for bonding steel plates, they do not operate satisfactorily for bonding non-ferrous metals. Although phosphorus epoxy resin products are effective for bonding non-ferrous metals such as zinc-plated steel plates, aluminum and stainless steel, their shearing strength and peeling strength are very poor and far from satisfactory.

Therefore, it is the object of the present invention to provide an adhesive epoxy resin composition that operates satisfactorily as an adhesive agent for non-ferrous metals, showing an excellent level of shearing strength and peeling strength.

SUMMARY OF THE INVENTION

After a series of intensive research efforts, the inventors of the present invention discovered that an urethane modified epoxy resin obtained by causing a condensation product of a specific epoxy resin and an acid of a specific phosphorus compound or its salt or ester to react with a specific urethane prepolymer is highly effective as an adhesive agent for non-ferrous metals if used with an active organic hardening agent to form a resin composition.

The inventors of the present invention also found that an urethane modified epoxy resin obtained by causing epoxy resin to react with a specific urethane prepolymer and then the reaction product to react with an acid of a specific phosphorus compound or its salt or ester as described above also operates effectively as an adhesive agent. The present invention is based on these findings.

More specifically, according to an aspect of the invention, there is provided an urethane modified epoxy resin obtained by reaction of 100 weight portions of a preliminary condensate [A] produced by reaction of an epoxy resin containing in average within a molecule two or more than two epoxy groups and 0.1 or more than 0.1 hydroxy groups and an acid of a phosphorus compound having within a molecule at least a P—OH bond or its salt or ester at a ratio of one (1) equivalent of epoxy group in the epoxy resin to an equivalent between 0.02 and 0.8 of hydroxy group in the phosphorus compound and 5 to 60 weight portions of an isocyanate group-terminated urethane prepolymer [B] produced by reaction of a hydroxy compound and an organic polyisocyanate compound, provided that the equivalent number of hydroxy groups contained in the preliminary condensate [A] is greater than the equivalent number of isocyanate groups contained in the urethane prepolymer [B].

According to another aspect the invention, there is also provided an adhesive resin composition containing an urethane modified epoxy resin as described above and an active organic hardening agent.

According to still another aspect of the invention, there is also provided an urethane modified epoxy resin obtained by preparing an urethane modified epoxy resin [D] from 100 weight portions of an epoxy resin containing in average within a molecule two or more than two epoxy groups and 0.1 or more than 0.1 hydroxy groups and 5 to 60 weight portions of an isocyanate group-terminated urethane prepolymer [B] produced by reaction of a hydroxy compound and an organic polyisocyanate compound, provided that the equivalent number of hydroxy groups contained in the epoxy resin is greater than the equivalent number of isocyanate groups contained in the urethane prepolymer [B], and causing the urethane modified epoxy resin [D] to react with an acid of a phosphorus compound having within a molecule at least a P—OH bond or its salt or ester at a ratio of one (1) equivalent of epoxy group in the epoxy resin to an equivalent between 0.02 and 0.6 of hydroxy group in the phosphor compound.

According to a further aspect of the invention, there is also provided an adhesive resin composition containing an urethane modified epoxy resin as described above and an active organic hardening agent.

An adhesive epoxy resin composition according to the invention shows excellent peeling strength and shearing strength particularly when used for bonding non-ferrous metals as compared with known resin compositions for general purpose adhesives and adhesives for structures.

DESCRIPTION OF THE PREFERRED EMBODIMENTS

For the purpose of the present invention, "an epoxy resin containing in average within a molecule two or more than two epoxy groups and 0.1 or more than 0.1 hydroxy groups" is a reaction product of a substituted or unsubstituted divalent phenol and a compound selected from epihalohydrins, methylepihalohydrins, ethylepihalohydrins and dihalohydrins. The reaction product thus contains in average within a molecule two or more than two glycidylether groups expressed by a general formula below.

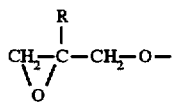

where R is a hydrogen atom, a methyl group or an ethyl group.

For the purpose of the invention, the divalent phenol refers to a phenol compound comprising one or more than one aromatic nuclei that have two replaceable hydroxy groups and may be selected from mono-nuclear divalent phenols and poly-nuclear divalent phenols.

Mono-nuclear divalent phenols that can be used for the present invention include resorcinol, hydroquinone, pyrocatechol, fluoroglycinol, dihydroxynaphthalene and dihydroxyanthraquinone.

Poly-nuclear divalent phenols that can be used for the present invention are expressed by a general formula below.

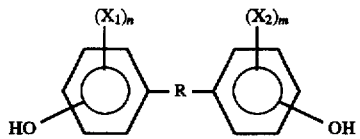

where $X_1$ and $X_2$ may be the same or differ from each other, each representing an alkyl group such as a methyl, n-propyl, n-butyl, or n-hexyl group, preferably an alkyl group having up to four (4) carbon atoms, a halogen atom such as chlorine, bromine, iodine, fluorine atom or an alkoxy group such as methoxy, methoxymethyl, ethoxy, ethoxyethyl, n-butoxy or amyloxy group, preferably an alkoxy group having up to four (4) carbon atoms and m and n are integers from 0 to 4 that may be the same or different, while R represents an alkylene or alkylidine group having one (1) to three (3) carbon atoms, —CO—, —O—, —S—, —SO— or —SO$_2$—. The OH group is preferably para with respect to R.

Examples of such divalent phenols include 2,2-bis-(p-hydroxyphenyl)-propane, 2,4'-dihydroxydiphenylmethane, bis-(4-hydroxyphenyl)-methane, bis-(4-hydroxy-2,6-dimethyl-3-methoxyphenyl)-methane 1,1-bis-(4-hydroxyphenyl)-ethane 2,2-bis-(3,5-dichloro-4-hydroxyphenyl)-propane, 2,2-bis-(2-isopropyl-4-hydroxyphenyl)-propane, bis-(4-hydroxyphenyl)-sulfone, 2,4'-dihydroxydiphenylsulfone, 5-chloro-2,4'-dihydroxydiphenylsulfone and the like.

Examples of epihalohydrins, methylepihalohydrins, ethylepihalohydrins and dihalohydrins that can be used for the purpose of the present invention include epichlorohydrin, epibromohydrin, methylepichlorohydrin, methylepibromohydrin, ethylepichlorohydrin, ethylepibromohydrin, dichlorohydrin, dibromohydrin and the like, of which epichlorohydrin and methylepichlorohydrin are particularly preferable.

The ratio at which a divalent phenol and a compound selected from epihalohydrins, methylepihalohydrins, ethylepihalohydrins and dihalohydrins are caused to react is preferably one (1) mol of the former to one (1) to twenty (20) mols of the latter, more preferably one (1) mol of the former to five (5) to fifteen (15) mols of the latter and the epoxy equivalent of the obtained substituted or unsubstituted glycidylether compound is preferably between 120 and 500.

For the purpose of the invention, an acid of a phosphorus compound having within a molecule at least a P—OH bond is preferably selected from orthophosphoric acid, metaphosphoric acid, pyrophosphoric acid, phosphorous acid, polyphosphoric acid and phosphonic acid, of which orthophosphoric acid is most preferable.

For the purpose of the invention, a salt of an acid of a phosphorus compound is preferably selected from salts of the above acids such as potassium salts, sodium salts, lithium salts, calcium salts, zinc salts, aluminum salts, tin salts and barium salts, of which potassium dihydrogen phosphate and sodium dihydrogen phosphate are most preferable.

For the purpose of the invention, an ester of an acid of a phosphorus compound is preferably selected from mono- or di-esters of the above acids such as alkyl esters and hydroxyalkyl esters having up to eight (8) carbon atoms. More specifically, preferable candidates include esters having one or more than one ethyl, n-propyl, isopropyl n-butyl, 2-ethylhexyl, hydroxyethyl, hydroxybutyl, hydroxypropyl or hydroxypentyl groups. More preferable candidates are mono- or di-esters of ethyl, n-propyl, isopropyl and n-butyl.

For the purpose of the invention, the reaction between an epoxy resin and a phosphorus compound as described above is conducted at a ratio of one (1) equivalent of epoxy group in the epoxy resin to an equivalent between 0.02 and 0.8, preferably between 0.04 and 0.5, of hydroxy group in the phosphorus compound and the epoxy equivalent of the produced preliminary condensate (A) is preferably not more than 1,000.

While the reaction between an epoxy resin and a phosphorus compound may be conducted under a noncatalytic condition for the purpose of the invention, it may alternatively be conducted in the presence of a basic catalyst. Catalysts that can preferably be used for the purpose of the invention include inorganic alkalis such as sodium hydroxide and potassium hydroxide, tertiary amines such as triethylamine, triethanolamine and dimethylamine, imidazoles and quaternary ammonium salts such as tetramethylammoniumchloride. For the purpose of the invention, the reaction is conducted at temperature between 50° and 100° C. for a period between one (1) and five (5) hours.

For the purpose of the invention, hydroxy compounds that can be used to produce an isocyanate group-terminated urethane prepolymer (B) include di- or polyvalent polyetherpolyols, polyesterpolyols, caster oil derivatives and tolu oil derivatives. Polyols having a molecular weight between 500 and 3,000 may preferably be used.

Examples of polyetherpolyols that can be used for the purpose of the invention include diols such as polyoxyethylenepolyol, polyoxypropyleneglycol, polyoxybutyleneglycol and polytetramethyleneglycol and trivalent polyetherpolyols obtained by adding one or more than one propyleneglycols to glycerol or trimethylolpropane.

Examples of polyesterpolyols that can be used for the purpose of the invention may be prepared from polyvalent alcohols such as ethyleneglycol, propyleneglycol, diethyleneglycol, 1,4-butanediol, 1,6-hexanediol, 2-methyl-1,5-pentanediol, 2,2-dimethyl-propanediol, glycerol and trimethylolpropane and polybasic acids such as adipic acid, terephthalic acid, isophthalic acid, glutaric acid, azelaic acid, dimer acid, and pyromellitic acid. Additionally, lactonepolyols may also preferably be used.

Any one of the above-listed hydroxy compounds may be combined for use for any appropriate portion for the purpose of the invention.

One of the components of the urethane prepolymer (B), the isocyanate compound can be selected from toluylene diisocyanate, methylenediphenyl, diisocyanate, hexane diisocyanate and isophorone diisocyanate, of which toluylene diisocyanate and isophorone diisocyanate may preferably be used.

An isocyanate group-terminated urethane prepolymer (B) is prepared for the purpose of the invention by combining one or more than one of the above listed hydroxy compounds and an isocyanate compound selected from the above listed chemicals so that its content of the isocyanate group(s) may be found between 1 and 15% by weight, preferably between 2 and 10% by weight.

The reaction between the preliminary condensate (A) of an epoxy resin and an acid of a phosphorus compound having within a molecule at least a P—OH bond or its salt or ester and the urethane prepolymer (B) is conducted at a ratio by weight of 100:5 to 100:60, preferably 100:10 to 100:40, provided that the equivalent number of hydroxy groups contained in the preliminary condensate (A) is greater than the equivalent number of isocyanate groups contained in the urethane prepolymer (B).

For the purpose of the invention, the reaction is conducted at a temperature between 60° and 140° C., preferably between 70° and 110° C. under a noncatalytic condition, although it may alternatively be conducted in the presence of a tertiary amine, lead octylate, or dibutyltinlaurate or the like as a catalyst.

Next, a technique that can be used for causing the epoxy resin to react with the urethane prepolymer [B] to produce an urethane modified epoxy resin [D] and then making the reaction product [D] further to react with the phosphorus compound to produce an urethane modified epoxy resin according to the invention will be described.

Firstly, the epoxy resin and the urethane prepolymer [B] are put to react with each other at a ratio by weight of 100:5 to 100:60, preferably 100:10 to 100:40. Note, however, that the equivalent number of hydroxy groups contained in the epoxy resin has to be greater than that of isocyanate groups contained in the urethane prepolymer in order to completely consume the urethane prepolymer [B] in the reaction.

The above reaction is preferably conducted at temperature between 60° and 140° C., more preferably between 70° and 100° C. While the reaction may be conducted under a noncatalytic condition, although it may alternatively be conducted in the presence of a tertiary amine, lead octylate or dibutyltinlaurate as a catalyst.

Secondly, the reaction between the urethane modified epoxy resin [D] and the phosphorus compound is conducted at a ratio of one (1) equivalent of epoxy group in the epoxy resin to an equivalent between 0.02 and 0.6, preferably between 0.03 and 0.5, of hydroxy group in the phosphor compound.

While the above reaction may be conducted under a noncatalytic condition, it may alternatively be conducted in the presence of a basic catalyst. Catalysts that can preferably be used include inorganic alkalis such as sodium hydroxide and potassium hydroxide, tertiary amines such as triethylamine, triethanolamine and dimethylamine, imidazoles and quaternary ammonium salts such as tetramethylammoniumchloride. The reaction is preferably conducted at temperature between 50° and 100° C.

The obtained urethane modified epoxy resin can be hardened to show an excellent peeling strength as well as an outstanding shearing strength with regard to steel plates and non-ferrous metals when crosslinked by an active organic hardening agent.

The active organic hardening agent may be selected from aliphatic polyamines, aromatic polyamines, polyamides, acid anhydrides, polymercaptans and latent hardening agents that can be used for hardening various epoxy resins.

Latent hardening agents that can be used for the purpose of the invention include dicyandiamide and its derivatives, imidazoles, boron trifluoride-amine complexes, acid hydrazides such as succinic acid hydrazide and diaminomaleonitrile and its derivative. The hardened product obtained by adding a hardening agent and heating shows an excellent shearing strength and an outstanding peeling strength.

The active organic hardening agent is added at a ratio with which the equivalent number of active hydrogen of the hardening agent is found between 0.90 to 1.10 relative to that of epoxy groups of the urethane modified epoxy resin.

As described in detail above, an urethane modified epoxy resin according to the invention can advantageously be used with an active organic hardening agent to produce an adhesive resin composition, which is highly effective for bonding iron and non-ferrous metals such as aluminum, zinc, copper and other transient metals particularly in terms of shearing strength and peeling strength.

EXAMPLES

The present invention will be described by way of manufacturing examples and other examples, although the present invention is by no means limited thereto. "Portions" in the following description refers to "portions by weight".

Manufacturing Examples of Preliminary
Condensate (A) of an Epoxy Resin and a
Phosphorus Compound Manufacturing Example 1

3 Portions of an orthophosphoric acid was mixed with 100 portions of a bis-phenol-A type diglycidylether ("Adecaresin EP-4100"—trade name: available from ASAHI DENKA KOGYO K.K., epoxy equivalent 190) and the mixture was left for reaction at 75° C. for two (2) hours to produce a preliminary condensate (A-1).

Manufacturing Examples 2–10

Preliminary condensates (A-2 through 10) were prepared in a manner as described above for Manufacturing Example 1 with the ratios of an epoxy resin and a phosphorus compound and the reaction parameters listed in Table 1 below.

Comparative Manufacturing Example

15 Portions of an orthophosphoric acid was dropped into and mixed with 100 portions of a bis-phenol-A type diglycidylether ("Adecaresin EP-4100"—trade name: available from ASAHI DENKA KOGYO K.K., epoxy equivalent 190) at 65° C. for reaction (P—OH/epoxy group=0.85) only to gelate the mixture.

TABLE 1

| Components (Epoxy equivalent) | Manufacturing Examples | | | | | | | | | |
|---|---|---|---|---|---|---|---|---|---|---|
| | 1 | 2 | 3 | 4 | 5 | 6 | 7 | 8 | 9 | 10 |
| Epoxy resins | | | | | | | | | | |
| Bisphenol-A-diglycidylether (190) | 100 | 100 | 100 | 100 | 100 | 100 | — | — | — | — |
| Bisphenol-A-diglycidylether (250) | — | — | — | — | — | — | 100 | — | — | — |
| Bisphenol-F-diglycidylether (180) | — | — | — | — | — | — | — | 100 | — | — |
| Tetrabromobis-phenol-A-diglycidylether (450) | — | — | — | — | — | — | — | — | 100 | — |
| Resorcinol diglycidylether (130) | — | — | — | — | — | — | — | — | — | 100 |
| Phosphorus compounds | | | | | | | | | | |
| Orthophosphoric acid | 3 | 8 | — | — | — | — | — | — | — | — |
| Sodium dihydrogen phosphate | — | — | 5 | — | — | — | 8 | — | 7 | — |
| Calcium dihydrogen pyrophosphate | — | — | — | 5 | — | — | — | — | — | — |
| Monoethyl phosphate | — | — | — | — | 10 | — | — | 15 | — | — |
| Monobutyl phosphate | — | — | — | — | — | 8 | — | — | — | 10 |
| P-OH/epoxy group (Equivalent ratio) | 0.17 | 0.47 | 0.12 | 0.09 | 0.30 | 0.20 | 0.26 | 0.43 | 0.40 | 0.17 |
| Reaction temperature (°C.) | 75 | 70 | 75 | 75 | 80 | 80 | 80 | 85 | 85 | 80 |
| Reaction time (hrs) | 2 | 3 | 3 | 3 | 4 | 4 | 3 | 4 | 3 | 4 |
| Epoxy equivalent of preliminary condensate | 237 | 500 | 227 | 220 | 300 | 256 | 365 | 362 | 820 | 175 |
| Denomination of preliminary condensate | A-1 | A-2 | A-3 | A-4 | A-5 | A-6 | A-7 | A-8 | A-9 | A-10 |

Manufacturing Examples of Isocyanate Group-Terminated Urethane Prepolymer (B)

Manufacturing Example 11

100 Portions of a polyoxypropyleneglycol having a molecular weight of 1,000 was mixed with 35 portions of a toluylenediisocyanate and the mixture was made to react at 85° C. for three (3) hours to produce a prepolymer (B-1) containing isocyanate groups by 6.3%.

Manufacturing Examples 12–17

Prepolymers (B-2 through 7) were prepared in a manner as described above for Manufacturing Example 11 with the ratios of a hydroxy compound and an isocyanate compound and the reaction parameters listed in Table 2 below.

TABLE 2

| Components | Manufacturing Examples | | | | | | |
|---|---|---|---|---|---|---|---|
| | 11 | 12 | 13 | 14 | 15 | 16 | 17 |
| Hydroxy compounds | | | | | | | |
| Polyoxypropyleneglycol (Mw: 1000) | 100 | 100 | — | — | — | — | 100 |
| Polytetramethyleneglycol (Mw: 2000) | — | — | 100 | — | — | — | — |
| Polycaprolactonediol (Mw: 1500) | — | — | — | 100 | — | — | — |
| Glycerol added with propyleneoxide (Mw: 3000) | — | — | — | — | 100 | — | — |
| Butanediol/adipatepolyol (Mw: 1000) | — | — | — | — | — | 100 | — |
| Isocyanate compounds | | | | | | | |
| Toluylene diisocyanate | 35 | 23 | 20 | 23 | 18 | 60 | — |
| Isophorone diisocyanate | — | — | — | — | — | — | 45 |
| Reaction temperature (°C.) | 85 | 90 | 80 | 80 | 90 | 85 | 95 |
| Reaction time (hrs) | 3 | 4 | 3 | 4 | 3 | 3 | 5 |
| Isocyanate content of prepolymer (%) | 6.3 | 2.2 | 4.6 | 4.5 | 3.8 | 7.6 | 5.9 |
| Denomination of urethane prepolymer | B-1 | B-2 | B-3 | B-4 | B-5 | B-6 | B-7 |

Manufacturing Examples of Urethane Modified Epoxy Resin

Example 1

100 Portions of the preliminary condensate (A-1) of an epoxy resin and a phosphorus compound was held to 80° C.

and 20 portions of the urethane prepolymer (B-1) was dropped thereto to cause the mixture to react for four (4) hours and produce an urethane modified epoxy resin with an epoxy equivalent of 285.

Examples 2 through 11

Urethane modified epoxy resins (Examples 2 through 11) were prepared in a manner as described above for Example 1 with the ratios of a preliminary condensate and an urethane prepolymer and the reaction parameters listed in Table 3 below.

TABLE 3

| | Components | | Reaction | | |
|---|---|---|---|---|---|
| | Preliminary condensate/ prepolymer | Ratio | temperature (°C.) | Reaction time (hrs) | Epoxy equivalent of product |
| Example 1 | A-1/B-1 | 100/20 | 80 | 4 | 285 |
| Example 2 | A-1/B-2 | 100/40 | 85 | 7 | 333 |
| Example 3 | A-2/B-2 | 100/30 | 80 | 6 | 655 |
| Example 4 | A-3/B-3 | 100/25 | 80 | 4 | 285 |
| Example 5 | A-4/B-4 | 100/20 | 85 | 5 | 266 |
| Example 6 | A-5/B-5 | 100/25 | 85 | 6 | 375 |
| Example 7 | A-6/B-6 | 100/15 | 80 | 4 | 300 |
| Example 8 | A-7/B-7 | 100/20 | 95 | 5 | 440 |
| Example 9 | A-8/B-1 | 100/20 | 90 | 4 | 437 |
| Example 10 | A-9/B-3 | 100/10 | 100 | 3 | 905 |
| Example 11 | A-10/B-6 | 100/15 | 85 | 4 | 202 |

Comparative Example 1

100 Portions of a bis-phenol-A type diglycidylether ("Adecaresin EP-4100"—trade name: available from ASAHI DENKA KOGYO K.K., epoxy equivalent 190) 20 portions of the urethane prepolymer (B-1) was mixed to cause the mixture to react at 80° C. for four (4) hours and produce an urethane modified epoxy resin.

Comparative Example 2

100 Portions of the preliminary condensate (A-1) of an epoxy resin and a phosphorus acid was held at 80° C. and 3 portions of the urethane prepolymer (B-i) was added thereto to cause the mixture to react for four (4) hours and produce an urethane modified epoxy resin with an epoxy equivalent of 210.

Comparative Example 3

100 Portions of the preliminary condensate (A-1) of an epoxy resin and a phosphoric acid was held at 80° C. and 80 portions of the urethane prepolymer (B-2) was added thereto to cause the mixture to react for seven (7) hours and produce an urethane modified epoxy resin with an epoxy equivalent of 210.

Comparative Example 4

100 Portions of the preliminary condensate (A-1) of an epoxy resin and a phosphoric acid was held at 80° C. and 100 portions of the urethane prepolymer (B-1) was added thereto to cause the mixture to react for two (2) hours only to gelate the resin.

Adhesiveness Test (I)

100 Portions of an urethane modified epoxy resin, 2 to 9 portions of a dicyandiamide as a hardening agent and 50 portions of a calcium carboxide were mixed and kneaded by means of a three-roll device to produce a specimen of thermally hardenable resin composition for each of the Examples and Comparative Examples described above. The rate at which the hardening agent was added was such that the equivalent number of its active hydrogen was found 0.9 relative to that of epoxy groups of the epoxy resin.

Subsequently, the specimens were applied to test plates for hardening at 170° C. for 30 minutes and then subjected to a shearing strength test and a peeling strength test according to the related JIS Test Standards. The test plates were aluminum plates (JIS A-5052P) and zinc plated steel plates.

Table 4 below shows some of the obtained results.

TABLE 4

| | Aluminum | | Zinc plated | |
|---|---|---|---|---|
| | Tensile shearing strength (kgf/cm$^2$) | Peeling strength (kgf/inch) | Tensil shearing strength (kgf/cm$^2$) | Peeling strength (kgf/inch) |
| Example 1 | 140 | 15 | 230 | 18 |
| Example 2 | 125 | 13 | 220 | 17 |
| Example 3 | 110 | 12 | 215 | 16 |
| Example 4 | 130 | 14 | 230 | 18 |
| Example 5 | 135 | 15 | 230 | 18 |
| Example 6 | 130 | 14 | 225 | 17 |
| Example 7 | 130 | 11 | 225 | 15 |
| Example 8 | 110 | 12 | 210 | 15 |
| Example 9 | 105 | 12 | 210 | 15 |
| Example 10 | 110 | 10 | 215 | 15 |
| Example 11 | 100 | 10 | 210 | 14 |
| Comparative Example 1 | 60 | 4 | 140 | 7 |
| Comparative Example 2 | 50 | 1 | 120 | 1 |
| Comparative Example 3 | 30 | 5 | 90 | 8 |

Adhesiveness Test (II)

100 Portions of an urethane modified epoxy resin and 100 portions of a calcium carboxide were kneaded by means of a three-roll device and thereafter a 12 to 40 portions of a hardening agent was added thereto to produce a specimen of thermally hardenable resin composition for each of the Examples and Comparative Examples described above. A modified polyamideamine (available from ASAHI DENKA KOGYO K.K.) having an active hydrogen equivalent number of 115 used as a hardening agent was mixed such that the equivalent number of active hydrogen was equal to 1.0 relative to that of the epoxy resin.

Subsequently, the specimens were applied to test plates for hardening at 20° C. for 7 days and then subjected to a shearing strength test and a peeling strength test as in the case of Test (I) above.

Table 5 below shows some of the obtained results.

TABLE 5

| | Aluminum | | Zinc plated | |
|---|---|---|---|---|
| | Tensile shearing strength (kgf/cm$^2$) | Peeling strength (kgf/inch) | Tensile shearing strength (kgf/cm$^2$) | Peeling strength (kgf/inch) |
| Example 1 | 140 | 12 | 210 | 15 |
| Example 2 | 125 | 11 | 210 | 14 |

TABLE 5-continued

| | Aluminum | | Zinc plated | |
|---|---|---|---|---|
| | Tensile shearing strength (kgf/cm$^2$) | Peeling strength (kgf/inch) | Tensile shearing strength (kgf/cm$^2$) | Peeling strength (kgf/inch) |
| Example 3 | 110 | 10 | 205 | 15 |
| Example 4 | 130 | 12 | 195 | 15 |
| Example 5 | 135 | 12 | 210 | 15 |
| Example 6 | 130 | 11 | 210 | 14 |
| Example 7 | 130 | 10 | 215 | 12 |
| Example 8 | 110 | 10 | 200 | 12 |
| Example 9 | 105 | 10 | 200 | 12 |
| Example 10 | 110 | 9 | 205 | 12 |
| Example 11 | 100 | 9 | 200 | 12 |
| Comparative Example 1 | 60 | 2 | 140 | 5 |
| Comparative Example 2 | 50 | 0 | 120 | 0 |
| Comparative Example 3 | 30 | 1 | 90 | 4 |

Next, urethane modified epoxy resins, each obtained by causing a specific epoxy resin to react with the urethane prepolymer [B] and then making to react a specific phosphorus compound with the reaction product, will be described below.

For the isocyanate group-terminated urethane prepolymer (B), urethane prepolymers No. B-1 through B-7 listed in Table 2 were used.

Manufacturing Examples of Urethane Modified Epoxy Resin [D]

Manufacturing Example 18

100 Portions of an epoxy resin was held to 80° C. and 20 portions of the urethane prepolymer (B-1) was dropped thereto to cause the mixture to react for three (3) hours and produce an urethane modified epoxy resin (D-1) with an epoxy equivalent of 230.

Manufacturing Examples 19 through 25

Urethane modified epoxy resins (D-2 through D-8) were prepared in a manner as described above for Manufacturing Example 18 with the ratios of an epoxy resin and an urethane prepolymer and the reaction parameters listed in Table 6 below.

TABLE 6

| | | Manufacturing Examples | | | | | | | |
|---|---|---|---|---|---|---|---|---|---|
| Components (Epoxy equivalent) | | 18 | 19 | 20 | 21 | 22 | 23 | 24 | 25 |
| Epoxy resins | | | | | | | | | |
| Bisphenol-A-diglycidylether (190) | | 100 | — | — | 100 | — | 100 | 100 | — |
| Bisphenol-A-diglycidylether (250) | | — | 100 | — | — | — | — | — | — |
| Bisphenol-F-diglycidylether (175) | | — | — | 100 | — | — | — | — | 100 |
| Tetrabromobisphenol-A-diglycidylether (400) | | — | — | — | — | 100 | — | — | — |
| Urethane prepolymers | | | | | | | | | |
| B-1 | Polyoxypropyleneglycol/TDI[1] | 20 | — | 30 | — | — | — | — | — |
| B-2 | Polyoxypropyleneglycol/TDI | — | 40 | — | — | — | — | — | — |
| B-3 | Polytetramethyleneglycol/TDI | — | — | — | 30 | — | — | — | — |
| B-4 | Polycaprolactonediol/TDI | — | — | — | — | 15 | — | — | — |
| B-5 | Glycerol-propyleneoxide/TDI | — | — | — | — | — | 25 | — | — |
| B-6 | Butanediol/adipatepolyol/TDI | — | — | — | — | — | — | 10 | — |
| B-7 | Polyoxypropyleneglycol/IPDI[2] | — | — | — | — | — | — | — | 30 |
| NCO/OH (Equivalent ratio) | | 0.76 | 0.26 | 0.37 | 0.83 | 0.86 | 0.57 | 0.46 | 0.58 |
| Reaction temperature (°C.) | | 80 | 90 | 85 | 80 | 90 | 85 | 80 | 85 |
| Reaction time (hrs) | | 3 | 4 | 4 | 3 | 4 | 4 | 3 | 5 |
| Epoxy equivalent of preliminary condensate | | 230 | 352 | 228 | 250 | 518 | 240 | 232 | 230 |
| Denomination of preliminary condensate | | D-1 | D-2 | D-3 | D-4 | D-5 | D-6 | D-7 | D-8 |

[1] toluylene diisocyanate
[2] isophorone diisocyanate

Manufacturing Examples of Urethane Modified Epoxy Resin

Example 12

100 Portions of the urethane modified epoxy resin (D-1) and 3 portions of orthophosphoric acid was mixed and caused to react with each other at 55° C. for two (2) hours to produce an urethane modified epoxy resin with an epoxy equivalent of 310.

Examples 13 through 19

Urethane modified epoxy resins (Examples 13 through 19) were prepared in a manner as described above for Example 12 with the ratios of a urethane modified epoxy resin and a phosphoric compound and the reaction parameters listed in Table 7 below.

TABLE 7

| | Components | | | P—OH/ epoxy group (Equivalent ratio) | Reaction temperature (°C.) | Reaction time (hrs) | Epoxy equivalent |
|---|---|---|---|---|---|---|---|
| | Urethane modified epoxy resin | Phosphorus compound | Mixing ratio | | | | |
| Example 12 | D-1 | Orthophosphoric acid | 100/3 | 0.21 | 55 | 2 | 310 |
| Example 13 | D-2 | Orthophosphoric acid | 100/5 | 0.54 | 55 | 3 | 815 |
| Example 14 | D-3 | Sodium dihydrogen phosphate | 100/5 | 0.15 | 75 | 3 | 284 |
| Example 15 | D-4 | Monoethyl phosphate | 100/7 | 0.21 | 80 | 3 | 335 |
| Example 16 | D-5 | Monoethyl phosphate | 100/10 | 0.06 | 85 | 4 | 554 |
| Example 17 | D-6 | Isopropyl phosphate | 100/3 | 0.04 | 80 | 3 | 255 |
| Example 18 | D-7 | Isopropyl phosphate | 100/15 | 0.42 | 90 | 4 | 455 |
| Example 19 | D-8 | Potassium dihydrogen phosphate | 100/3 | 0.10 | 75 | 3 | 266 |

The specimens of Examples 12 through 19 were then subjected to adhesiveness tests as described above by Test (I) and (II). The obtained results are listed in Tables 8 and 9 below along with those for Comparative Examples 1 through 3.

TABLE 8

| | Aluminum | | Zinc plated | |
|---|---|---|---|---|
| | Tensile shearing strength (kgf/cm$^2$) | Peeling strength (kgf/inch) | Tensile shearing strength (kgf/cm$^2$) | Peeling strength (kgf/inch) |
| Example 12 | 135 | 15 | 230 | 18 |
| Example 13 | 130 | 14 | 220 | 17 |
| Example 14 | 140 | 13 | 235 | 16 |
| Example 15 | 140 | 15 | 230 | 18 |
| Example 16 | 120 | 11 | 210 | 14 |
| Example 17 | 140 | 15 | 225 | 17 |
| Example 18 | 110 | 10 | 210 | 13 |
| Example 19 | 125 | 12 | 215 | 15 |
| Comparative Example 1 | 60 | 4 | 140 | 7 |
| Comparative Example 2 | 50 | 1 | 120 | 1 |
| Comparative Example 3 | 30 | 5 | 90 | 8 |

TABLE 9

| | Aluminum | | Zinc plated | |
|---|---|---|---|---|
| | Tensile shearing strength (kgf/cm$^2$) | Peeling strength (kgf/inch) | Tensile shearing strength (kgf/cm$^2$) | Peeling strength (kgf/inch) |
| Example 12 | 125 | 12 | 210 | 15 |
| Example 13 | 125 | 12 | 205 | 15 |
| Example 14 | 130 | 11 | 215 | 16 |
| Example 15 | 130 | 12 | 210 | 16 |
| Example 16 | 110 | 10 | 200 | 12 |
| Example 17 | 135 | 12 | 210 | 13 |
| Example 18 | 100 | 10 | 200 | 11 |
| Example 19 | 110 | 11 | 205 | 13 |
| Comparative Example 1 | 60 | 2 | 140 | 5 |
| Comparative Example 2 | 50 | 0 | 120 | 0 |
| Comparative Example 3 | 30 | 1 | 90 | 4 |

What is claimed is:

1. A urethane-modified epoxy resin containing epoxy groups obtained by reacting 100 parts by weight of a preliminary condensate [A] with from 5 to 60 parts by weight of an isocyanate groups-terminated urethane prepolymer [B] wherein preliminary condensate [A] is produced by racing (i) an epoxy resin containing an average of two or more epoxy groups and 0.1 or more hydroxy groups per molecule, the hydroxyl equivalent of the epoxy resin is from 0.04 to 0.11 per 100 g. thereof, with (ii) an acid of a phosphorus compound having at least one P—OH group, its salt or ester per molecule, at a ratio of between 0.09 and 0.47 hydroxy group equivalent of the phosphorus compound per one epoxy group equivalent of the epoxy resin, the isocyanate groups-terminated urethane prepolymer [B] is produced by reacting (i) a polyvalent hydroxy compound with (ii) an organic polyisocyanate compound, and the equivalent number of hydroxy groups in preliminary condensate [A] is greater than the equivalent number of isocyanate groups in urethane prepolymer [B].

* * * * *